C. B. Hutchison,

Cider Mill,

No. 3,925.

Reissued Apr. 19 1870.

Witnesses:
E. G. Stocke
Jas S. Bradburn

Inventor:
Charles B. Hutchison

N. PETERS, PHOTO-LITHOGRAPHER, WASHINGTON, D. C.

United States Patent Office.

JAMES B. BROWN, OF PEEKSKILL, NEW YORK, ASSIGNEE OF CHARLES B. HUTCHINSON.

*Letters Patent No.* 29,490, *dated August* 7, 1860; *reissue No.* 3,925, *dated April* 19, 1870.

DIVISION A.

IMPROVEMENT IN MILLS.

The Schedule referred to in these Letters Patent and making part of the same.

Be it known that CHARLES B. HUTCHINSON, of Auburn, in the State of New York, made certain new and useful Improvements in Mills for reducing Apples and other Fruits to Pomace, and pressing the same; and that I, JAMES B. BROWN, the assignee of the entire right of said HUTCHINSON to said invention, do hereby declare that the following is a full, clear, and exact description thereof, reference being had to the accompanying drawings forming a part of this specification.

In the drawings—

The nature of said HUTCHINSON's invention (as claimed in this Division A) is certain combinations and arrangements of parts, making a cheaper, more compact implement than when these parts are arranged as heretofore; and Said invention consists—

First, in the arrangement of the essential parts in the following manner, to wit: The curb being embraced and supported by the same legs which support the pomace-mill, fixed in permanent position directly over it, the press-screw passing vertically through the mill-casing and centering upon the follower, while the delivery-aperture of the mill is completely within the area of the curb, so that the pomace will drop directly from the former into the latter without the aid of a lateral chute or spout, the whole operation of grinding and pressing being thereby effected without displacing any of the above-named parts.

Second, the construction and arrangement of the pomace-mill case, with its discharge-opening, and the press-screw.

Third, the combination and arrangement of the mill-case, the press-screw, and the curb, with their inclosing and supporting-frame.

To enable others skilled in the art to carry said improvements into effect, one mode of constructing them will be described.

Figure 2:
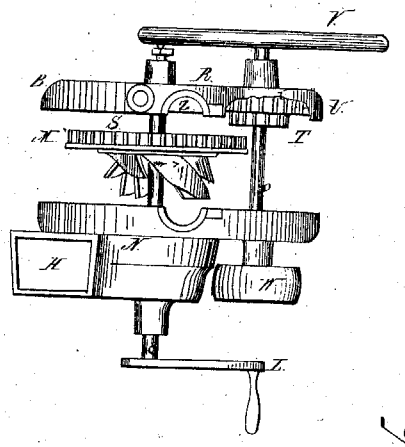
Figure 2 is a view of the top of the machine.
Figure 1:
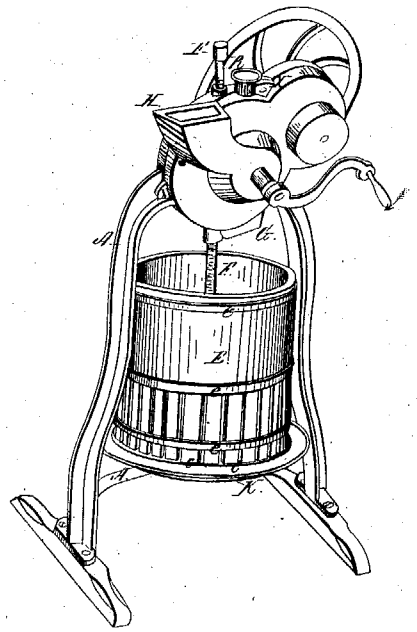
Figure 1 is a perspective view.

A proper form of the hopper and case is shown in fig. 1, by letter B, to which the vertical press-screw is securely attached. Its mere form is not essential, but it is important that it be constructed with a hopper or opening to receive the fruit, and an opening to discharge the pomace, and that the press-screw be connected to it.

A suitable opening is shown at H, in fig. 1, to admit the fruit, and G, in the same figure, indicates the discharge-opening, and F the vertical press-screw.

The fruit to be operated on is fed in at the opening or hopper H, and, after being operated on by a suitable pomace-making apparatus, is discharged as pomace at G.

The press-screw F and case B, when connected together, may be mounted upon any suitable frame or support, though it is preferred to attach them directly to the legs, as shown in fig. 1, and, also, that the case shall serve as the bearings of a crushing or grinding-apparatus for making the pomace.

Figure 3:
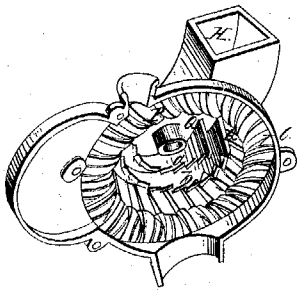
Figures 3 and 4 are "detail views."
Figure 4:
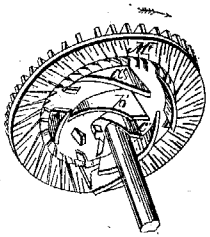

As it is not the method of making the pomace-making apparatus that constitutes a part of the invention as claimed in division A, but the arrangement of the curb in relation to these parts, it will be sufficient to show this arrangement and combination by describing a grinding or crushing apparatus, as follows:

The disk of the wheel M, fig. 4, is provided with projecting teeth *m m*, which are intended to interlock and run by or between the projecting teeth, on an opposite disk or plate, illustrated in fig. 3. The size of the teeth and the distance they are apart will, to a great degree, determine the fineness the pomace will be made.

Any suitable curb of the usual construction, provided it has slits or openings to allow the juice to escape, will be sufficient. It is not the special manner of making the curb, but its arrangement and combination, that constitutes the invention.

To carry into effect the first feature of the invention, the curb in which the pomace is to be pressed is arranged within or between the legs A A, (as shown at E in fig. 1,) and in relation to the press-screw F, and to a suitable pomace-making apparatus connected to same legs, that the pomace can fall from the apparatus into the curb without the aid of a lateral spout or chute, and thus also allowing the press-screw to work in the curb, thereby producing a more compact, cheaper, and portable mill and press than when the parts are not so arranged, and the press-screw and curb are connected to one set of legs, and the pomace-making apparatus to another set.

The curb is connected to the lower part of the legs A A, so that the pressing can take place, if desirable, while the curb stands as it did while receiving the pomace.

The cross-piece A′, fig. 1, shows a suitable way of making the connection between the curb and the legs. The bed K will receive and conduct the juice away as it comes from the curb.

A follower is provided that is designed to work in the curb, and against this follower the lower end of the press-screw F, fig. 1, presses, forcing the follower against the pomace to extract the juice. It is an important feature in the follower that it is easily removed, so that the pomace can freely fall into the curb, instead of being fixed permanently on the end of the press-screw, as followers generally are.

By this means the curb is so arranged in relation to the pomace-making apparatus and vertical press-screw, that the pomace will fall directly into the curb, and the screw, also, work in the curb, so that the pressing can take place with the curb standing where it did while receiving the pomace.

The first claim is limited to a combination when the curb is located within and connected to the same legs that carry the press-screw and the pomace-making apparatus, as this is a most desirable way of making the combination.

One of the advantageous results is that hand cider-mills, which is the most important class of mills made under this patent, embracing this compact arrangement of parts, are made and sold to the public at about one half the cost of mills that do not use this arrangement.

I do not claim the several devices herein shown, nor any general combination of the same; but What I do claim is—

1. In the combined portable cider-mill and press, substantially as herein shown, an improved arrangement of parts, consisting of a permanently-fixed pomace-making apparatus, and the press-screw F, both connected to the upper part of the same legs which embrace and support the curb E, said screw bearing centrally upon the follower, while the delivering-aperture of the mill is completely within the area of the curb, so that the pomace will fall directly from the mill into the curb without the aid of a lateral chute or director, all in the manner and for the purposes herein set forth.

2. The case B, provided with its hopper and discharge-opening, in combination with the press-screw F passing vertically through the said case B, when these parts are constructed and arranged as and for the purposes herein set forth.

3. In combination with case B and press-screw F, passing vertically through said case, the frame A, the cross-piece A′, bed K, and curb E, embraced and supported thereby, when all these parts are arranged substantially in the manner and for the purposes herein set forth.

In testimony whereof, I, the said JAMES B. BROWN, have hereunto set my name.

J. B. BROWN.

Witnesses:
WARREN GALE,
BENJ. BASSETT.